(12) United States Patent
Martinez

(10) Patent No.: US 7,084,774 B2
(45) Date of Patent: Aug. 1, 2006

(54) TEMPERATURE CONTROL SYSTEM

(75) Inventor: Anthony Edward Martinez, St. Augustine, FL (US)

(73) Assignee: International Business Machines Corporation, Armonk, NY (US)

(*) Notice: Subject to any disclaimer, the term of this patent is extended or adjusted under 35 U.S.C. 154(b) by 335 days.

(21) Appl. No.: 10/713,744

(22) Filed: Nov. 13, 2003

(65) Prior Publication Data

US 2005/0103876 A1    May 19, 2005

(51) Int. Cl.
*G08B 17/00* (2006.01)

(52) U.S. Cl. ............... 340/584; 340/588; 340/589; 236/44 C; 236/51; 700/300; 701/36

(58) Field of Classification Search ............ None
See application file for complete search history.

(56) References Cited

U.S. PATENT DOCUMENTS

| | | | | |
|---|---|---|---|---|
| 4,326,386 A | | 4/1982 | Tamura | 62/150 |
| 4,460,036 A | * | 7/1984 | Yoshimi et al. | 165/203 |
| 4,482,009 A | * | 11/1984 | Nishimura et al. | 165/203 |
| 4,570,450 A | * | 2/1986 | Takemi et al. | 62/199 |
| 4,617,986 A | * | 10/1986 | Kobayashi et al. | 165/42 |
| 4,696,167 A | * | 9/1987 | Matsui et al. | 62/180 |
| 4,796,438 A | | 1/1989 | Sato | 62/133 |
| 4,819,715 A | | 4/1989 | Kobayashi | 165/16 |
| 5,553,661 A | * | 9/1996 | Beyerlein et al. | 165/203 |
| 5,873,520 A | | 2/1999 | Ratgeber et al. | 236/94 |
| 5,966,070 A | | 10/1999 | Thornton | 340/425.5 |
| 6,202,934 B1 | * | 3/2001 | Kamiya et al. | 236/91 C |
| 6,407,389 B1 | * | 6/2002 | Nishii et al. | 250/338.1 |
| 6,460,356 B1 | | 10/2002 | Tao et al. | 62/175 |
| 6,550,686 B1 | * | 4/2003 | Kawai et al. | 236/49.3 |
| 6,659,358 B1 | * | 12/2003 | Kamiya et al. | 236/49.3 |
| 6,910,931 B1 | * | 6/2005 | Nakase | 441/106 |
| 7,004,910 B1 | * | 2/2006 | Lindsey | 600/549 |
| 2004/0210283 A1 | * | 10/2004 | Rose et al. | 607/96 |

* cited by examiner

*Primary Examiner*—Benjamin C. Lee
*Assistant Examiner*—Son Tang
(74) *Attorney, Agent, or Firm*—David A. Mims, Jr.; Robert V. Wilder (57) ABSTRACT

A method and implementing computerized system are provided for enabling point-specific temperature control for a given airspace. In an exemplary embodiment, infrared sensing devices are positioned in a vehicle to sense and record temperatures at various points within the vehicle airspace. This temperature profile is mapped relative to points within the vehicle and compared to a preferred temperature database to provide temperature control signals. The temperature control signals are, in turn, applied to temperature control air vent devices which are effective to direct appropriate air flows to specific areas such that actual measured temperatures at control points in the vehicle airspace approach the preferred temperatures for the respective control points. In another example, when sensed temperatures are above or below predetermined emergency condition limits for a predetermined period of time, various alarm systems are activated until the sensed emergency condition is corrected.

30 Claims, 8 Drawing Sheets

TEMPERATURE CONTROL SYSTEM

FIELD OF THE INVENTION

The present invention relates generally to information processing systems and more particularly to a methodology and implementation for enabling automatic control of variable temperature profiles and related alarm systems.

BACKGROUND OF THE INVENTION

Currently, temperature control systems, while found to be generally satisfactory in most situations, are not sufficient for many environments where ambient temperatures are quite variable and difficult to control. For example, when a motor vehicle is speeding along a long stretch of highway on a sunny day, the sun rays enter the vehicle from only one angle while the vehicle continues to travel in the same direction. Occupants of the vehicle on the side of the vehicle where the suns rays are entering tend to be hotter than occupants on the other side of the vehicle, and those on the sun side of the vehicle tend to be hotter on the side of their body adjacent to the window compared to the inside of the vehicle in general. This situation creates uneven temperature profiles throughout the vehicle where some of the occupants are at a comfortable temperature and others are either too hot or too cold. The problem becomes worse when the vehicle changes directions and begins to travel in another direction in which the suns rays enter the vehicle from another direction and further adjustments to the air-conditioning or heating system need to be made.

In many vehicles, a two-setting temperature environment is provided in which a driver and a passenger for example are enabled to set different preferred temperatures for two frontal areas of the vehicle. Some vehicles have settings for more than two persons. For example, some mini-vans have settings for rear passengers as well as for the front passengers. While this may provide some control over general area temperatures of the vehicle, it does not address the above noted sun-ray heating problem and it is only marginally effective even for specific vehicle area heating since there is generally a great deal of spontaneous mixing with the amorphous and continuous air volume within the vehicle.

The temperature control problem is present on hot days when air-conditioning systems are required to cool the air, and also on cold days when heating system control is required to heat the air inside the vehicle. In hot climates especially, however, there is a much greater need for temperature balancing on a personal level than current technology affords. In a four passenger car, each person may have particular requirements for cooling. Personal needs are also constantly changing. As a result, each person in a vehicle may be constantly manipulating the air-conditioner vents to change the direction of the air flow so that cooler air will be directed to each person's "hot spots", i.e. the areas on each person's body which are, for example, being heated by the incoming rays of the sun. Then, after a while, or when the vehicle changes directions or the sun becomes blocked by a cloud, the previous "hot spots" become too cold for comfort and further manual adjustments are required to the air vents for direction, the temperature settings to adjust air flow temperature and the fan to adjust air flow volume. This activity is an endless cycle and is quite distracting especially to a driver who is usually the person most familiar with the temperature control devices for the vehicle. The "hot spot" problem is also common in many other passenger carriers including busses, trains and airplanes. In airplanes, it is noted that in certain passenger sections of the plane, especially when the plane is cruising at a high altitude, "cold spots" or areas where the area temperature is generally lower than the overall ambient cabin temperature are common. In these situations it would be desirable for the individual passengers to be able to automatically control temperature points in the air immediately adjacent to the passenger.

Another more serious and even life-threatening problem with current temperature control systems occurs when a vehicle is parked or disabled with infants inside the vehicle. When the vehicle heats up internally to a temperature which is life-threatening, there is no way to counter-act the heating effect of a parked vehicle unless someone is present to turn-on the air-conditioning system. The same is true for vehicles which are disabled and exposed to extremely cold temperatures for extended periods of time. In either case, there needs to be a temperature control system which will sense an extreme temperature condition and automatically take corrective action, including automatic temperature control as well as activating one or more alarm systems.

Thus, there is a need for an improved methodology and system for enabling automatic control of temperature points within contiguous air mass environments.

SUMMARY OF THE INVENTION

A method and implementing computerized system are provided for enabling point-specific temperature control for a given airspace. In an exemplary embodiment, infrared sensing devices are positioned to sense and record temperatures at various points within the airspace. This temperature profile is mapped relative to points within the airspace and compared to a preferred temperature database to provide temperature control signals. The temperature control signals are, in turn, applied to temperature control devices which are effective to direct appropriate air flows to specific areas such that actual measured temperatures at control points in the airspace approach the preferred temperatures for the respective control points. In another example, when sensed temperatures are above or below predetermined emergency condition limits for a predetermined period of time, various alarm systems are activated until the sensed emergency condition is corrected.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention. Although the present invention is herein disclosed in a motor vehicle example, it is understood that the invention applies as well to any environment in which it is desirable to control temperature conditions at various points within a designated air space.

In an exemplary embodiment of the present invention, heat sensors such as infrared cameras are coupled to processing circuitry to control air vents and fans to provide tailored temperature balancing in a dynamically changing environment and to prevent and/or initiate alarm systems when an extreme temperature condition is detected.

Figure 1:
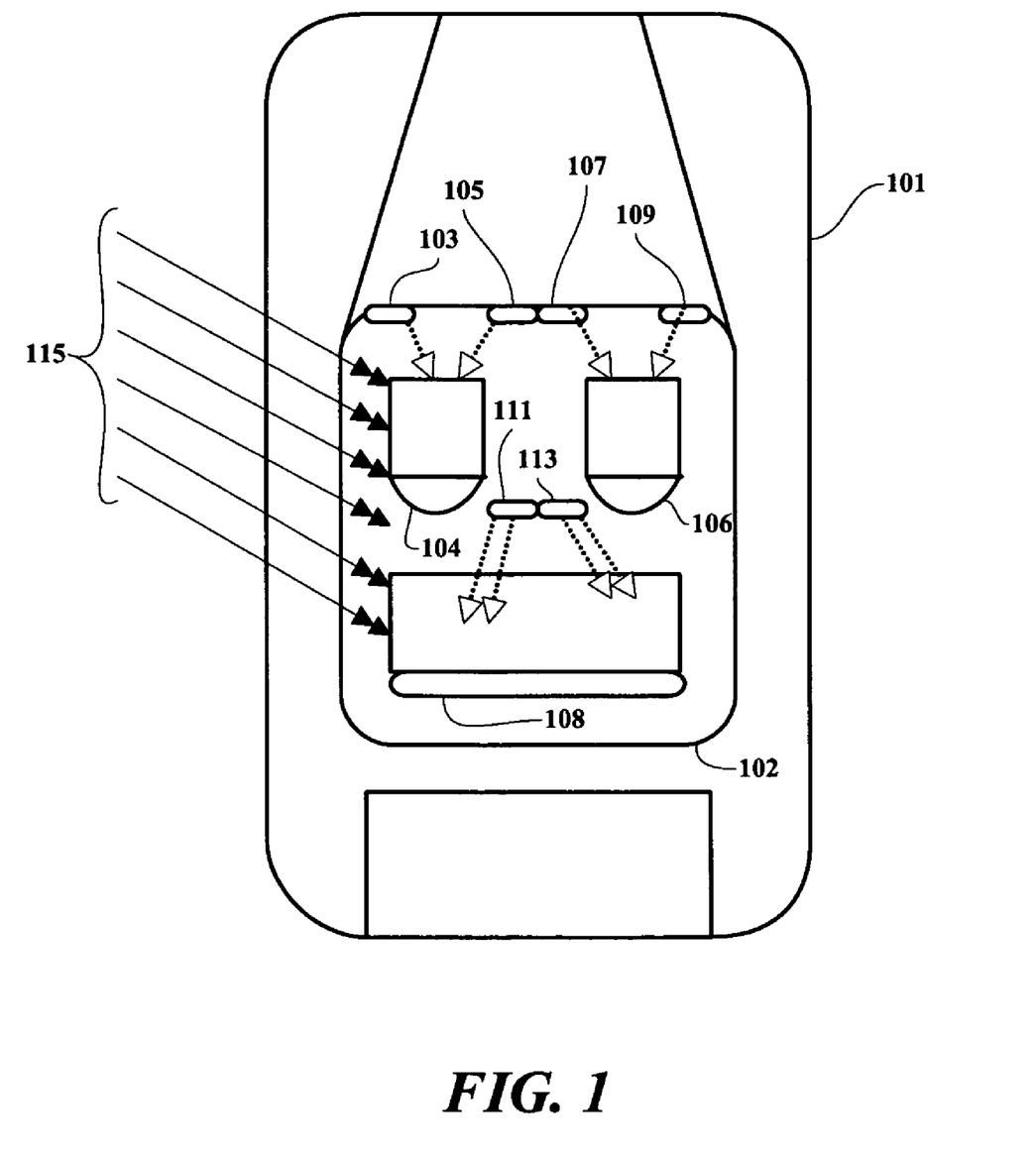
FIG. 1 is an illustration showing an exemplary environment in which the present invention may be used.

As shown in FIG. 1, a motor vehicle 101 includes an internal compartment or air space 102 containing a driver seat 104, a front passenger seat 106 and a rear seat 108. The vehicle 101 also includes front air vents 103, 105, 107 and 109 which are arranged for directing temperature controlled air to the driver's seat 104 and a passenger seat 106. Also shown are rear vents 111 and 113 which are arranged to direct air to occupants seated in the rear seat 108. Currently, air vents such as those shown are manually adjusted to direct air flow in only the direction in which the air vents are manually aimed. Further, the flow of air is typically exiting all of the vents at the same flow speed, i.e. "High", "Medium" or "Low" for example. When the vehicle 101 is traveling in a direction with the sun ahead and to the left of the vehicle, the sun's rays 115 enter the vehicle through the windows on the left side of the vehicle as shown. The sun's rays will also enter the vehicle through the front window but for purposes of explanation, the present discussion will be limited to an appreciation of what occurs in connection with the sun's rays entering the vehicle through the side windows as shown.

In the environment shown in FIG. 1, the driver in seat 104 as well as a passenger seated on the left side of rear seat 108 will be exposed to the sun's rays 115 while other passengers in the vehicle will not have this exposure. Accordingly, the left side of the driver and the left side of the rear-left passenger will feel hotter on the left side of their bodies and not so hot on the right side of their bodies. The other passengers who are not exposed to the sun's rays will not feel the added heat of the sun. Typically, in this situation, a driver will manually adjust the air vents 103 and 105 to direct cool air in the driver's direction. When the sun passes over an intervening cloud, or when the direction of the vehicle changes, however, the heating of the sun's rays changes and the driver may now feel too cold and a further manual adjustment of the air vents 103, 105 and 111 will be required.

In a related example, if an infant is seated in the left side of the rear seat 108, the infant will become hotter more quickly than if the infant were seated in another area of the vehicle which did not receive direct rays of the sun 115. Where the vehicle is parked, an oven effect takes place and the vehicle is heated even more by the sun's rays and if the air conditioning system is turned off, an emergency and life-threatening condition could develop rapidly.

Figure 2:
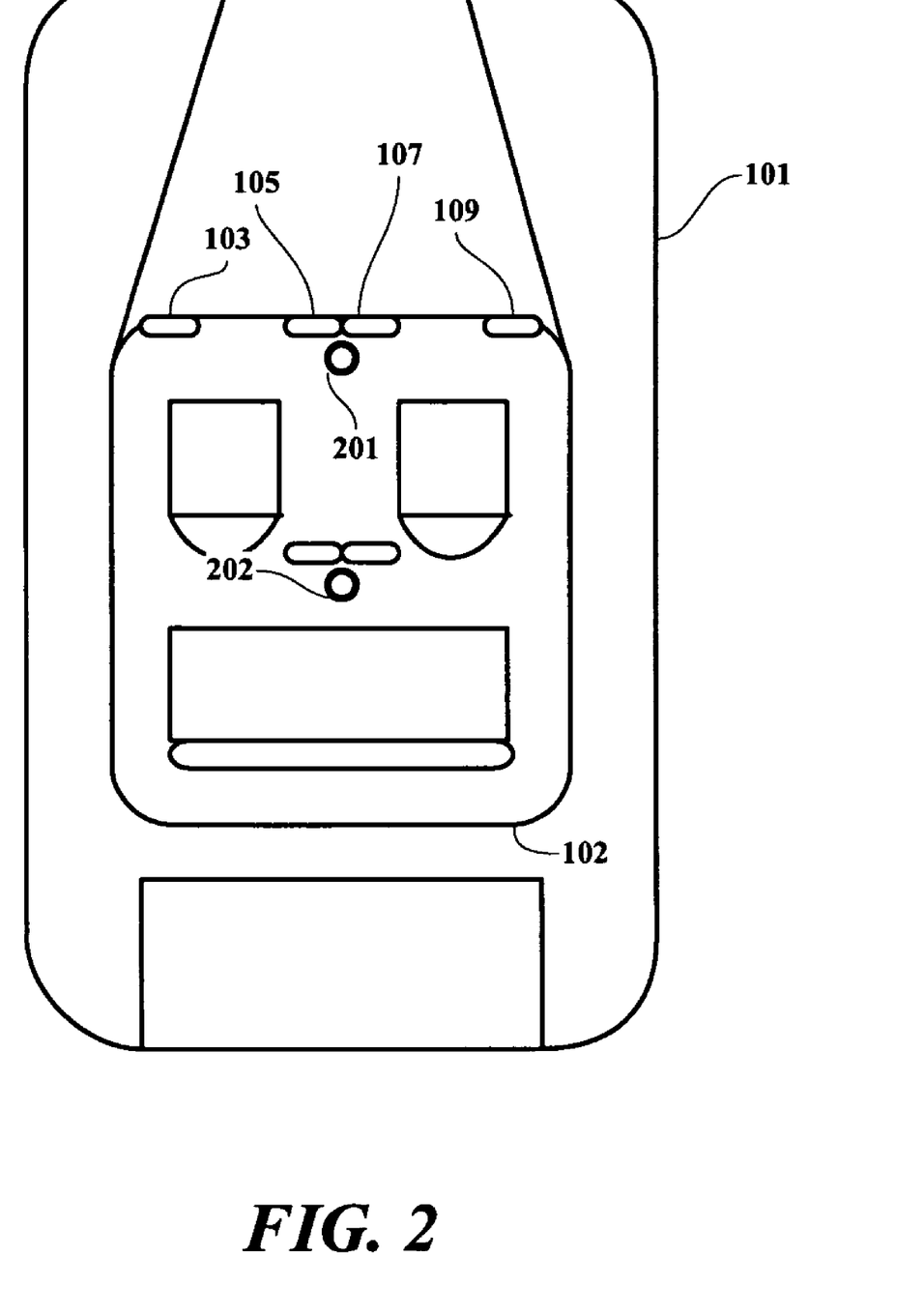
FIG. 2 is an illustration showing locations of infrared cameras in a vehicle in an exemplary embodiment of the present invention.

As shown in FIG. 2, in addition to the air vents, first and second infrared cameras 201 and 202 are shown mounted in the passenger compartment 102 of the vehicle 101. In the example, the infrared (IR) cameras are mounted overhead. Additional IR cameras may be used and mounted in various locations such as on the side pillars of the vehicle for increased temperature sensitivity and control. The IR cameras 201 and 202 may be turned on when the system is active or off when the system is inactivated. A user may inactivate or turn off the system when a vehicle is parked outside on the street for an extended period of time with no one in the vehicle and the driver wishes to avoid alarms which may be generated when the temperature of the inside of the vehicle exceeds predetermined limits. The function of the IR cameras is to sense and map a temperature profile within the air space scanned by the IR camera. The IR cameras scan the space inside of the vehicle and sense the temperatures of all points scanned in a continuous manner. These points and associated sensed temperatures at the various points are then plotted and recorded as a dynamic database to provide a temperature profile of various points within the vehicle 101.

Figure 3:
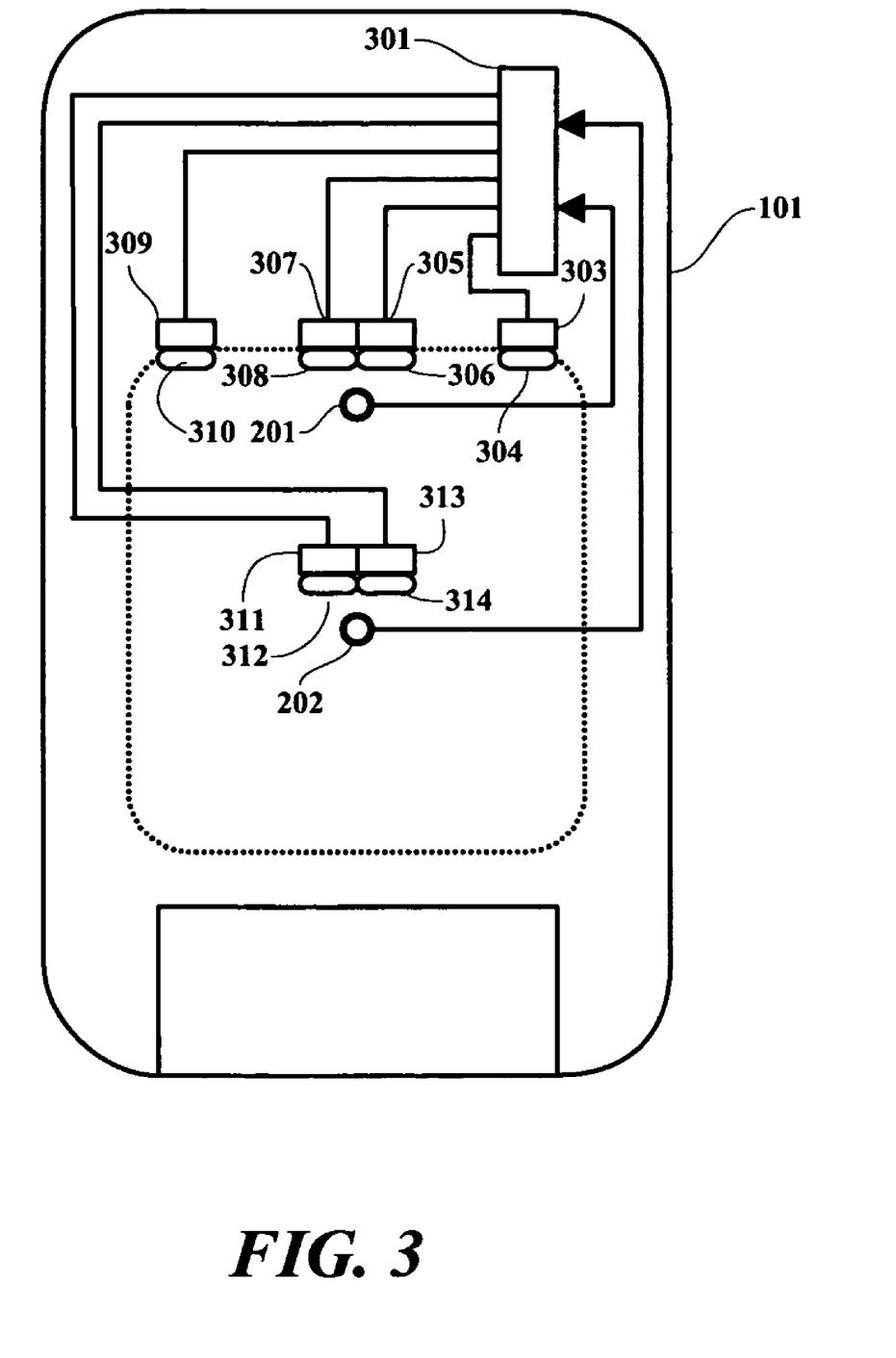
FIG. 3 illustrates an exemplary control system in accordance with the present invention.

In FIG. 3, there is shown a schematic diagram of the electrical control system for controlling temperature points within the vehicle 101. As shown, the IR cameras 201 and 202 are connected to control circuitry 301 which processes the signals and provides individual air flow control signals which are applied to air flow control elements located throughout the vehicle. A first air flow control signal is applied to a first air flow control module 309 for controlling the direction and speed of the air flow through an associated air vent 310. Similarly, other air flow control vents 304, 306, 308, 312 and 314 are controlled by associated control modules 303, 305, 307, 311 and 313, respectively. Each air flow vent includes screw-drive or motor devices for changing vented air direction in response to control signals received from the control circuit 301. Each vent is individually controlled in both direction of air flow and speed of air flow by different air flow control signals generated by the control circuitry 301 in response to the temperature point profile developed by the IR cameras 201 and 202. Thus, the present invention enables point control of temperatures within a given air space. For example, using the example of FIG. 1, the IR cameras will sense the elevated temperatures on the left side of the driver and the left-rear seat passenger and pass this information on to the control circuit 301 in the form of a temperature profile. The control circuit 301 will then generate signals to effect an increased air flow directed at the driver and the left-rear seat passenger while at the same time generate signals effective to cause a reduced or normal air flow through other air vents in the vehicle 101. When the IR cameras sense that the temperature at the previously elevated temperature points on the left side of the vehicle have been stabilized, and the temperatures have been reduced to a predetermined comfort range, then the temperature profile will so indicate and the control signals generated by the control circuit will cause a reduced flow of air through the left side vehicle vents. This automatic control will continue until the system is turned off. It is noted that the air control system may be designed to run independently of the vehicle itself so that the temperature control system will function if turned on even though the vehicle itself may be turned off. This feature enables the temperature control system to sense extreme temperature conditions in a vehicle that is not operational. This is an extremely valuable arrangement especially when there are sleeping or unconscious adults or infants inside of a vehicle which may be parked along a street or trapped under a snow bank.

Figure 4:
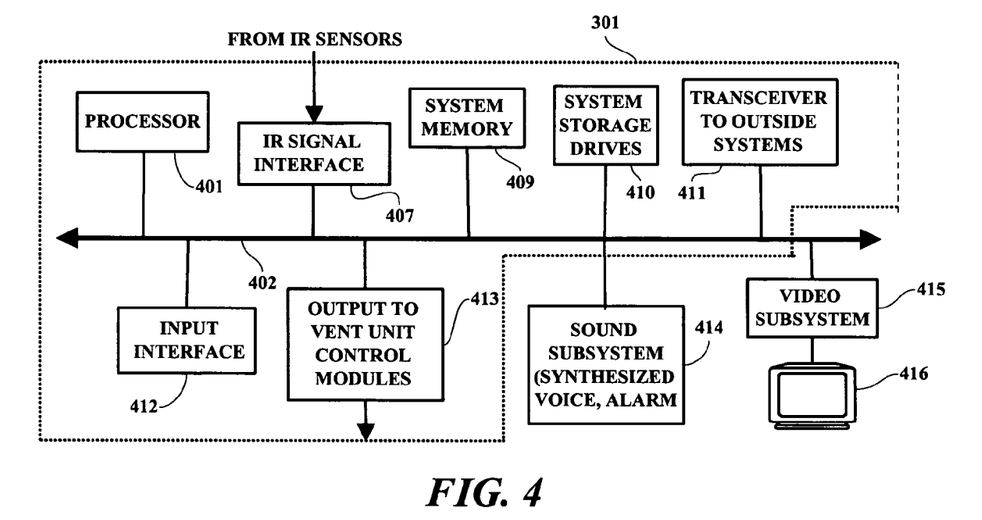
FIG. 4 illustrates an exemplary embodiment of a temperature control module onboard the vehicle.

FIG. 4 illustrates an exemplary embodiment of the control circuitry 301. As shown, the control circuitry 301 includes a processor 401 which is connected to a system bus 402. The control circuit module 301 receives input from the IR sensors or cameras 201 and 202 which are applied through an IR signal interface 407 to the system bus 402. The system bus 402 is also connected to system memory 409, system storage drive units 411 and an input interface 412. The input interface 412 may be used to input designated commands from a driver of the vehicle, either by voice commands or push-button/toggle switch input (not shown) in order to activate and/or de-activate the system, for example. System storage includes programming and databases which are used in analyzing and saving the point temperature profiles sensed by the IR cameras 201 and 202 as well as predetermined databases containing information defining ideal temperature limits within the vehicle profile. Such predetermined databases may also contain cooling algorithms specific to cooling the configuration of the particular vehicle in which the system is installed and may take into account such information as specific air flow information, window covering information, insulation values for windows and walls of the vehicle, etc. A transceiver 411 is also included to enable communications with outside systems such as automatically transmitting emergency and/or location messages to an outside entities such as an owner's cell phone display or a vehicle monitoring and/or assistance service. The storage system 410 may be used to update vehicle data and/or temperature control programming. The system bus 402 is also connected to provide output signals 413 to the vent unit control modules 303, 305, 307, 309, 311 and 313. The sound subsystem 414 is also connected to the system bus and may include a synthesized voice capability as well as various alarms which may be used in connection with the present invention. A video subsystem 415 and display device 416 are also shown connected to the system bus 402. The video system 415, 416 may be used to display sensed temperature profile imagery inside of the vehicle and also a flashing alarm signal if the temperature in a portion of the vehicle exceeds certain predefined limits. The sound subsystem may be used to sound various alarms, including an alarm projected externally from the vehicle in emergency situations.

Figure 5A:
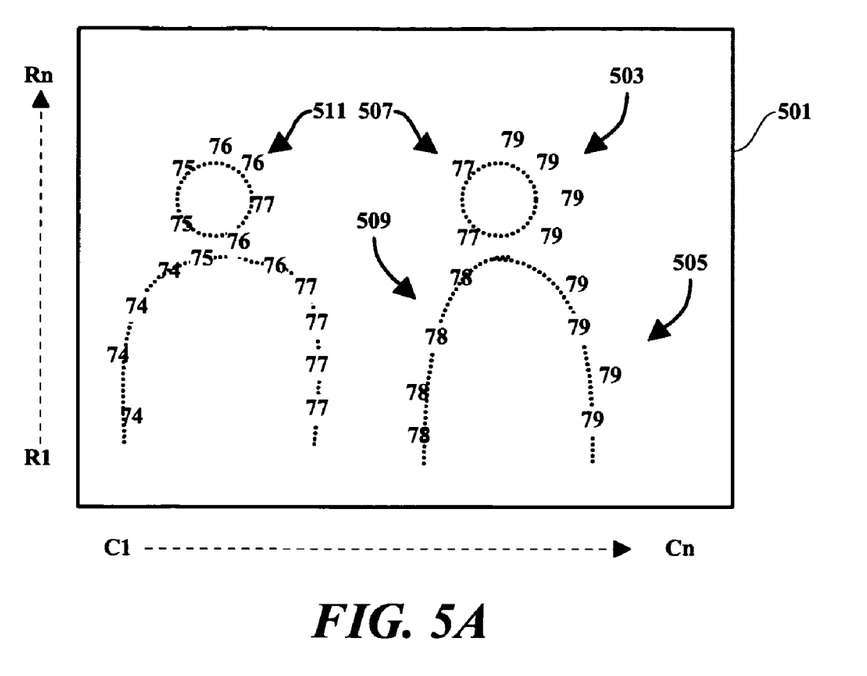
FIG. 5A illustrates an exemplary partial temperature profile of actual or measured temperatures at various points within a vehicle.
Figure 5B:
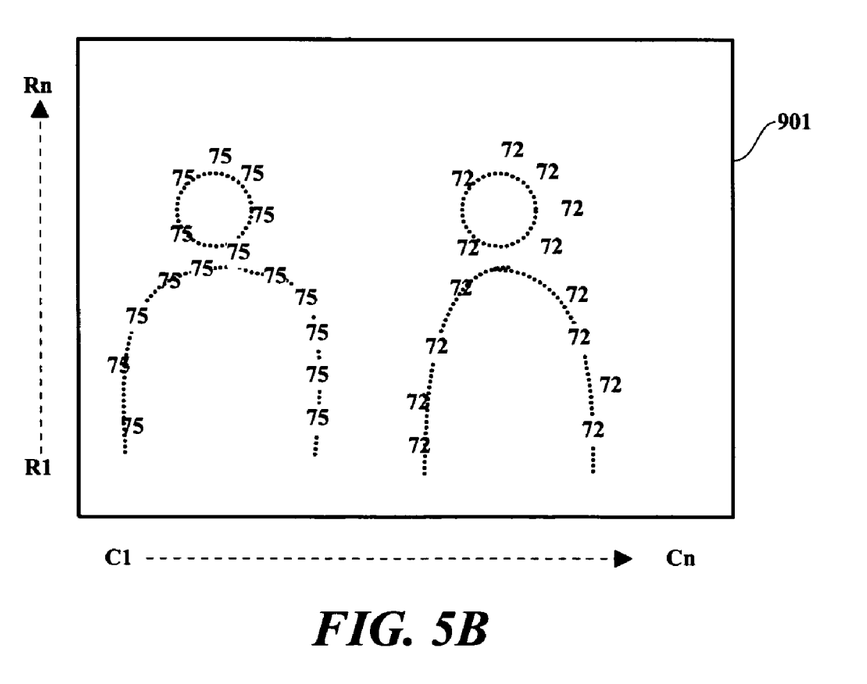
FIG. 5B illustrates an exemplary partial temperature profile of a reference database with preferred temperatures at various points within a vehicle.

In FIG. 5, there is shown a schematic diagram illustrating a portion of an exemplary temperature point profile database. For simplification, only selected temperature points are shown and only in one plane within the vehicle. Specifically, the illustrated temperature points are those sensed from the outlines of a driver 507 and a passenger 511 as seen by IR camera 201 in the front center of the vehicle. From that perspective, the driver is on the right side of the FIG. 5 drawing corresponding to the left side of the vehicle exposed to the sun's rays (115 FIG. 1). The numbers are a representation of the sensed or actual temperatures at various points, i.e. rows R1–Rn and columns C1–Cn, within the vehicle generally in a plane in which the driver and passenger are positioned. As shown, points 503 and 505 on the left side of the driver which is exposed to the rays of the sun are generally elevated (e.g. "79") above sensed temperatures which are sensed on the unexposed side 509 of the driver (e.g. "77"'s and "78"'s). Similarly, the temperatures sensed on the left side of the passenger are higher than those sensed on the right side of the passenger 511. When those values are mapped and sent to the control circuit for processing, temperature control signals are generated effective to increase the air flow directed at the left side of the driver and reduce the air flow directed to the right side of the passenger in the given example. FIG. 5B shows a reference database 901 containing the preferred temperatures at the various temperature control points in the vehicle corresponding to the control points indicated in FIG. 5A. The preferred temperatures are set by the driver and/or passenger by adjusting a control setting inside the vehicle. In the example, the driver's preferred temperature is 72 degrees and the passenger's preferred temperature is 75 degrees. The actual temperatures are compared with the preferred temperatures for each point in the airspace. The comparisons are made in the control module 301 and result in the generation of control signals for controlling the temperature at the various control points within the vehicle.

Figure 6:
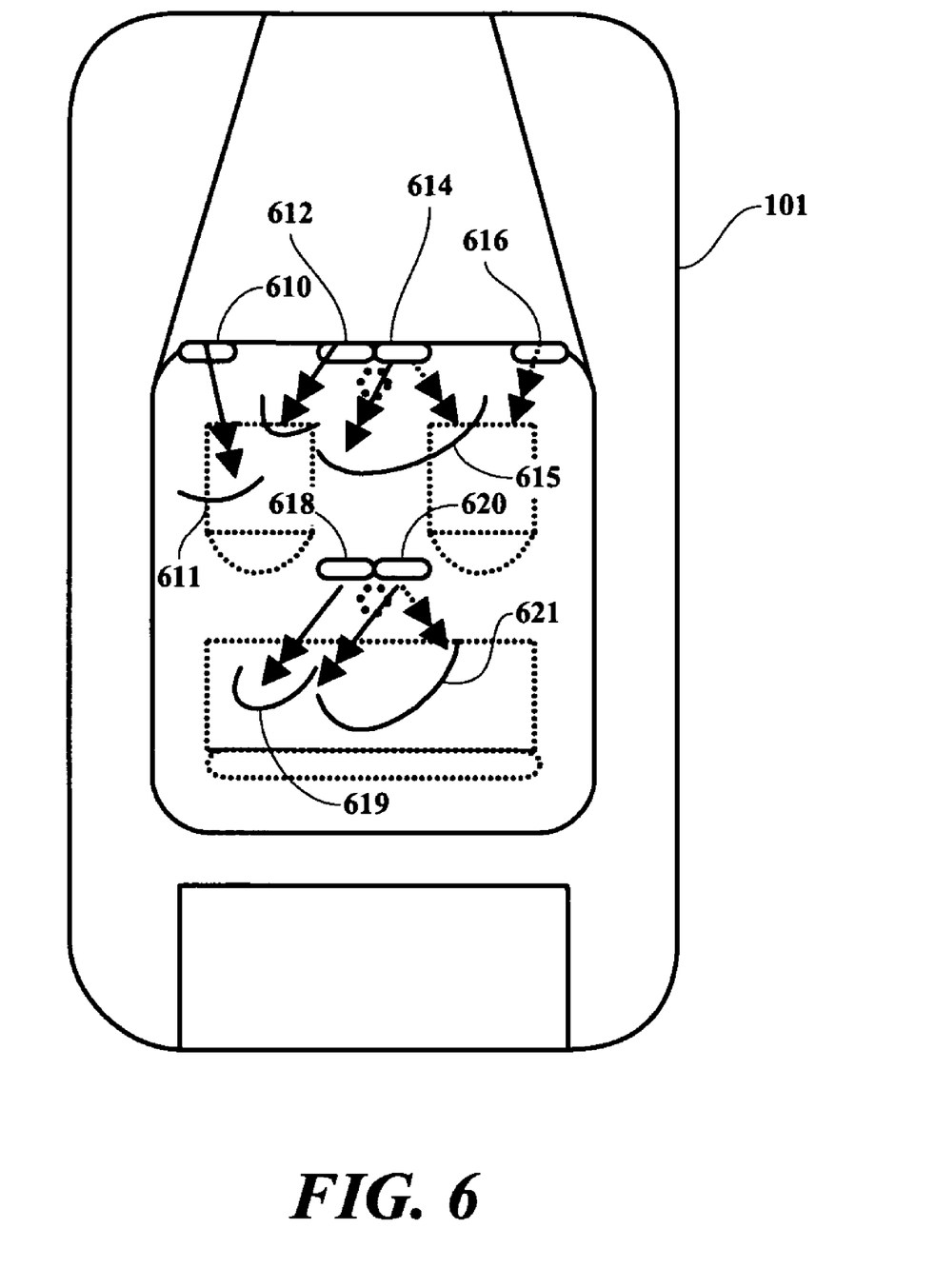
FIG. 6 illustrates an exemplary operation of temperature controlled air vectoring using the air vents of a vehicle.

In FIG. 6, air flow vectors are shown to illustrate the magnitude and direction of the air flow from the air vents 610, 612, 614, 616, 618 and 620 as well as the rotation of the air vents and associated air vectors accomplished in response to the control signals received from the control module 301. In the drawing, the vector from vent 610 is relatively strong and directed toward the left side of the driver and rotates along an arc 611 to cool the left side of the driver which is exposed to the sun. The air flow vector from vent 612 is also directed toward the driver's left side. The vector from vent 614 is strongest at the driver's side of its arc 615 and weaker when it is aimed at the passenger. The vector from the vent 616 is relatively weak and does not rotate in an arc since it is not necessary to increase or decrease the temperature of the sensed points but rather only to maintain the current temperature. In the rear of the vehicle, air from vent 618 rotates in a shortened arc 619 to direct most of its air toward the passenger on the left side of the vehicle. Vent 620 has a large air vector directed toward the left side of the vehicle which is exposed to the sun and rotates on an arc 621 to a smaller valued vector directed at the right side of the vehicle which does not receive direct sunshine in the present example. As illustrated, air flows from the vents of a vehicle are vectored and the air vents are rotated in response to the measured temperature point profile of the vehicle as sensed by the IR cameras to achieve and maintain an ideal temperature profile throughout the interior of the vehicle.

In busses, trains and airplanes, the vents corresponding to those shown in the vehicle of FIG. 6 are overhead of each passenger seat or passenger seat section. IR sensors are also installed overhead each passenger seat or section so that actual temperature profiles for each passenger can be measured and compared with each individual's preferred temperatures in order to provide automatic temperature control for profile points in a passenger's physical profile. In one embodiment, a seat-side control enables each individual passenger to select a comfort setting. This setting is either an exact preferred temperature in degrees or a more general preference such as "warm", "medium" or "cool". The IR sensors are then able to sense various points on the passenger's body, especially the more temperature-sensitive parts such as the ears, nose, hands and feet, and the temperature control system is then effective to insure that no part of the passenger's body gets too hot or too cold as compared with the passenger's preferred temperature. This is accomplished by sensing the colder points or warmer points and adjusting the airflow system accordingly as hereinbefore explained in connection with FIG. 6.

Figure 7:
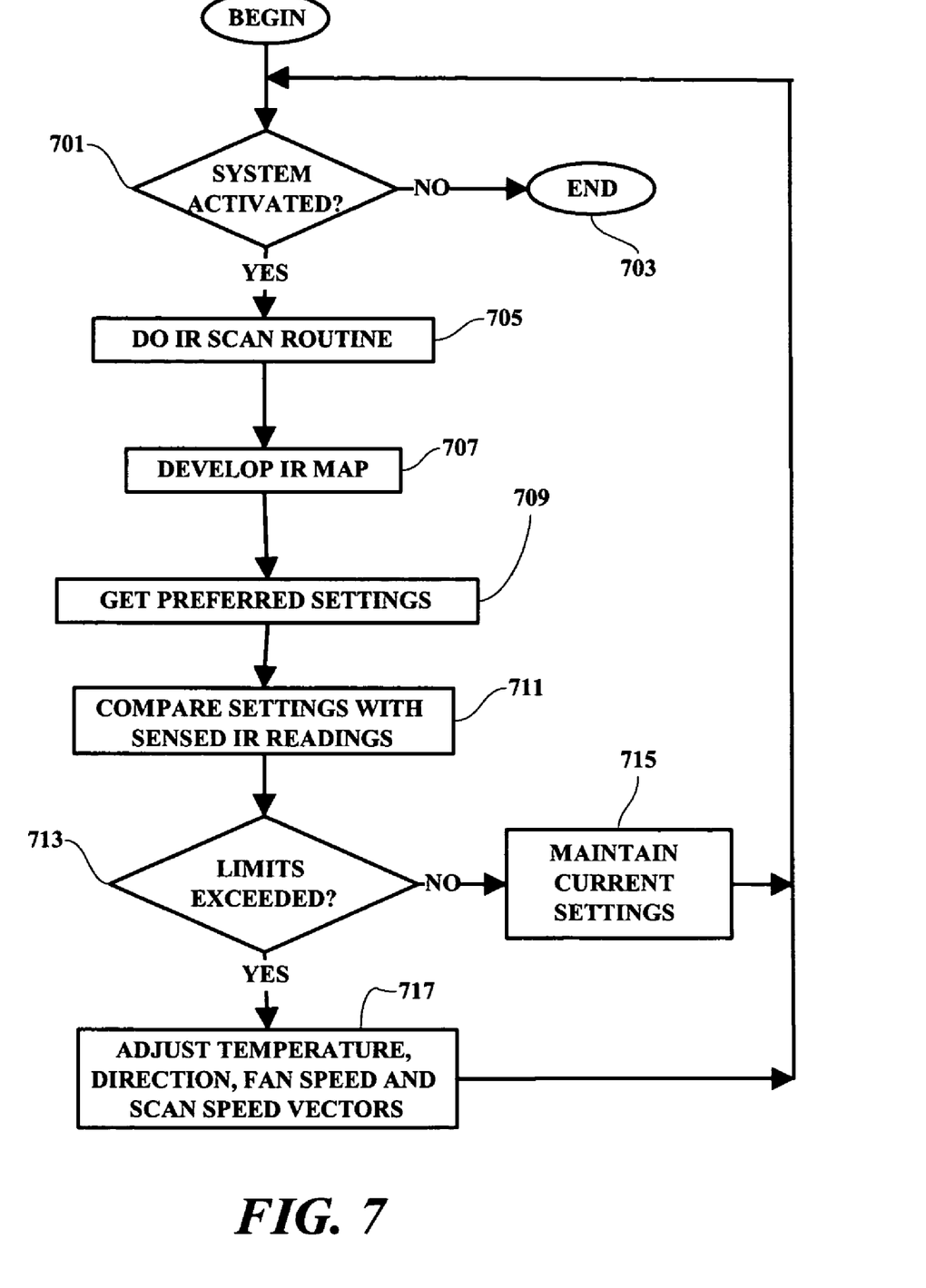
FIG. 7 is a flow chart illustrating a high level operational flow in an exemplary implementation of the present invention.

As shown in FIG. 7, the processing begins by determining that the system has been activated 701 or turned on by the driver. As noted earlier, the system may be selectively turned off if the vehicle is to remain in an open parking area, such as an uncovered airport parking lot, for an extended period of time and it is not necessary to keep the vehicle cooled. If the system is turned off, the processing ends 703. If the temperature control system is turned on 701, the IR scans are initiated 705 and temperature point profiles are developed 707. The measured temperatures are processed by comparing 711 each measured temperature at each point to a predetermined ideal temperature 709 at each point of measurement. If predetermined limits are not exceeded 713 then the current settings for the air flow vectors are maintained 715 and the process continues to scan and make necessary temperature point adjustments. If it is detected that predetermined ideal temperature limits are exceeded 713, then control signals are generated and applied to the air vent controls to adjust the temperature profile inside the vehicle by adjusting temperature, direction, fan speed and scan speed values for the individual air vents. The cycle repeats until the measured temperature profile is within a tolerance limit of the ideal temperature point profile for the passenger compartment space of the vehicle.

Figure 8:
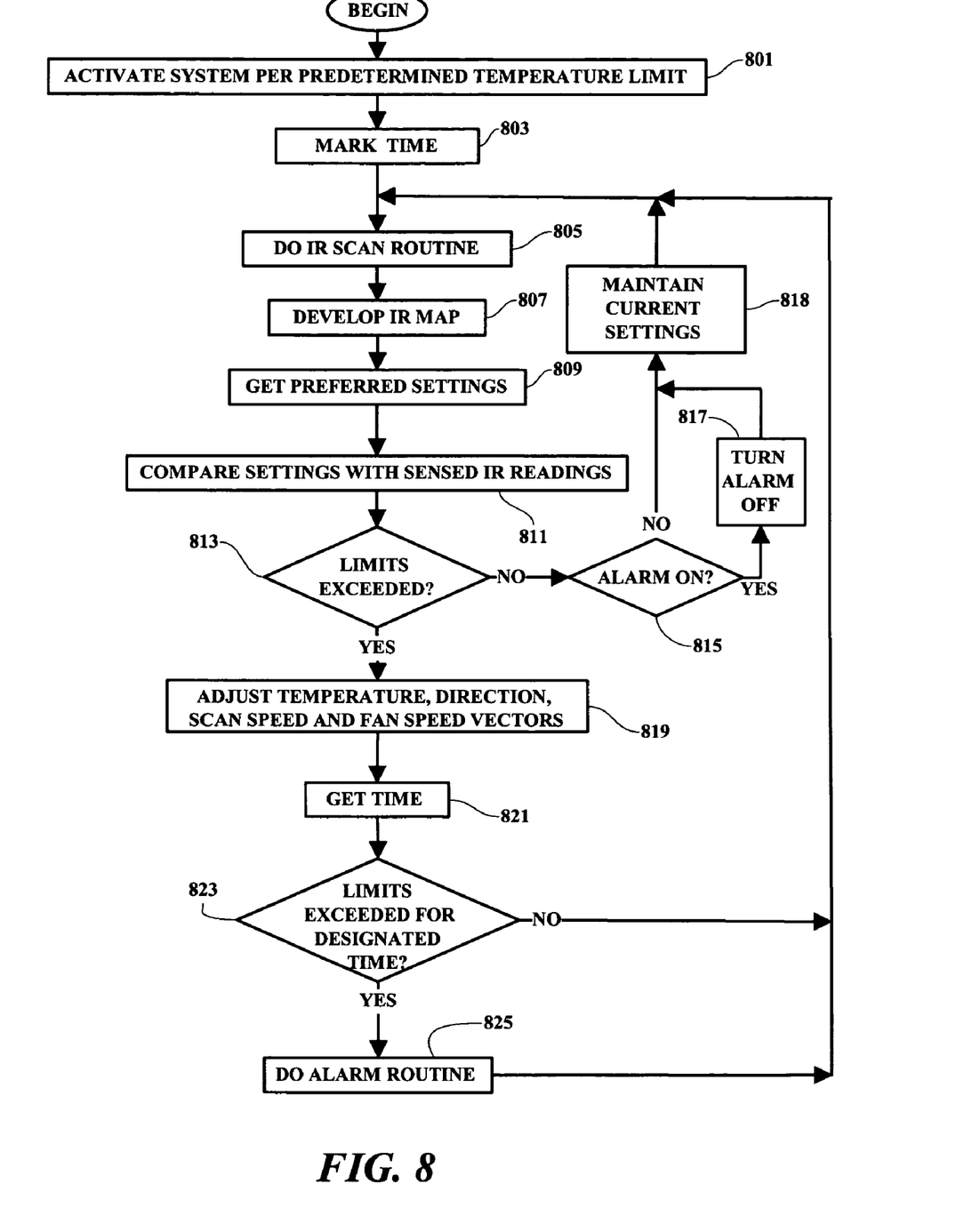
FIG. 8 is a flow chart illustrating a high level operational flow in another exemplary implementation of the present invention.

Another exemplary embodiment of an operational flow is shown in FIG. 8. As shown, the processing begins when the system is activated and a predetermined safe temperature limit is established 801. This can be set as a default value or may be input by a driver through an input interface 412. Next, the time that the system is started is marked 803, i.e. saved, for future reference. The IR scan routine is initiated 805, an IR temperature point profile map is developed 807 and the preferred setting are fetched from memory 809. Next the preferred settings are compared with the sensed IR readings 811 and if comfort temperature limits are exceeded 813 then the vent air vectors are adjusted 819 to compensate as described above. If the comfort limits are not exceeded at any point in the temperature profile 813, then a check 815 is made to turn off the alarm 817 if the alarm had been previously set and the vent control signals are adjusted so that the current temperature readings are maintained 818. If the comfort limits are exceeded 813, in addition to adjusting the vent vectors 819, the current time is fetched 821 and checked against the start time, and when the limits are exceeded for a designated maximum time 823 then an alarm system is activated 825 and alarms are sounded to alert people around the vehicle that there may be a temperature emergency inside the vehicle. The limit processing may also be accomplished using one value range for a comfort range and a second emergency temperature value to indicate when an emergency condition exists. Thus, if a driver is delayed beyond an expected short period of time to accomplish an errand outside of a vehicle, and the temperature inside of the vehicle becomes elevated to an unsafe value, then the temperature control system will sense the emergency situation and sound appropriate alarms. In one such alarm routine 825, when an alarm or emergency condition is detected within the vehicle, a predetermined alarm signal may be generated by the control circuit 301 and an appropriate predetermined email or voiced message may be transmitted automatically to a cell phone of the driver or to a vehicle monitoring and assistance service. Further, the vehicle may be equipped with a positioning system so that the location of the vehicle may be transmitted along with the alarm condition signal.

Another feature that may be incorporated in the disclosed methodology adjusts the point temperatures for the fact that different parts of the body have different heat profiles. For example, the head emits more heat than do the hands. The IR analysis would include a body-point factor or body heat profile such that when the IR system senses a higher temperature in an area where a person's head is located, the control signals are modified to factor-down the correcting airflow so as not to overly cool the head of a person. Such body heat algorithms which understand the human body architecture may be included in the processing in order to differentiate various body points such as the hands and the head, and balance the air flow vectoring in accordance with the person's temperature preferences.

The method and apparatus of the present invention has been described in-connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for controlling temperature at a plurality of control points, said control points lying along an edge of an object within an airspace surrounding said object, said object being movable within said airspace, said method comprising:

obtaining actual temperatures at a plurality of said control points within said airspace using an infrared temperature sensing means;

comparing said actual temperatures at said control points with a reference temperature database, said reference temperature database containing preferred temperatures at each respective one of said control points; and generating control signals for application to temperature control devices, said temperature control devices being operable in response to said control signals for changing temperatures at said control points by varying air flow to each respective one of said control points whereby said actual temperatures at each respective one of said control points are made to approach said preferred temperatures at each respective one of said control points within said airspace, wherein said airspace comprises airspace immediately surrounding said object wherein said obtaining is accomplished by said infrared temperature sensing means located to effectively sense point temperatures at said control points of said object, said temperature control devices comprising air vents located near said object to effectively control air temperature at said various control points.

2. The method as set forth in claim 1 wherein different control signals are generated for each of said temperature control devices, independently.

3. The method as set forth in claim 1 wherein said actual temperatures at said plurality of said control points are measured using an infrared scanning system.

4. The method as set forth in claim 3 wherein said infrared scanning system includes one or more infrared scanning cameras.

5. The method as set forth in claim 1 wherein said temperature control devices include a controllable fan device operable in response to said control signals for controlling air flow volume discharged from said temperature control devices into said airspace during a given period of time.

6. The method as set forth in claim 1 wherein said temperature control devices include a direction control device operable in response to said control signals for controlling direction of air flow volume discharged from said temperature control devices into said airspace.

7. The method as set forth in claim 6 wherein said temperature control devices include a controllable fan device operable in response to said control signals for controlling air flow volume discharged from said temperature control devices into said airspace during a given period of time.

8. The method as set forth in claim 7 wherein said actual temperatures at said plurality of said control points are measured using an infrared scanning system.

9. The method as set forth in claim 8 wherein said infrared scanning system includes one or more infrared scanning cameras.

10. The method as set forth in claim 1 and further including:
    establishing a high temperature limit value indicative of a high temperature alarm condition for one or more of said control points; and
    actuating an alarm system when said actual temperatures at said one or more control points exceed said high temperature limit value for a predetermined period of time.

11. The method as set forth in claim 1 and further including:
    establishing a low temperature limit value indicative of a low temperature alarm condition for one or more of said control points; and
    actuating an alarm system when said actual temperatures at said one or more control points are less than said low temperature limit value for a predetermined period of time.

12. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being selectively operable for controlling temperature at a plurality of control points, said control points lying along an edge of an object within an airspace surrounding said object, said object being movable within said airspace, by effecting the steps of:
    obtaining actual temperatures at a plurality of said control points within said airspace using an infrared temperature sensing means;
    comparing said actual temperatures at said control points with a reference temperature database, said reference temperature database containing preferred temperatures at each respective one of said control points; and
    generating control signals for application to temperature control devices, said temperature control devices being operable in response to said control signals for changing temperatures at each respective one of said control points by varying air flow to each respective one of said control points whereby said actual temperatures at each respective one of said control points are made to approach said preferred temperatures at each respective one of said control points within said airspace, wherein said airspace comprises airspace immediately surrounding said object wherein said obtaining is accomplished by said infrared temperature sensing means located to effectively sense point temperatures at said control points of said object, said temperature control devices comprising air vents located near said object to effectively control air temperature at said various control points.

13. The medium as set forth in claim 12 wherein different control signals are generated for each of said temperature control devices, independently.

14. The medium as set forth in claim 12 wherein said actual temperatures at said plurality of said control points are measured using an infrared scanning system.

15. The medium as set forth in claim 14 wherein said infrared scanning system includes one or more infrared scanning cameras.

16. The medium as set forth in claim 12 wherein said temperature control devices include a controllable fan device operable in response to said control signals for controlling air flow volume discharged from said temperature control devices into said airspace during a given period of time.

17. The medium as set forth in claim 12 wherein said temperature control devices include a direction control device operable in response to said control signals for controlling direction of air flow volume discharged from said temperature control devices into said airspace.

18. The medium as set forth in claim 17 wherein said temperature control devices include a controllable fan device operable in response to said control signals for controlling air flow volume discharged from said temperature control devices into said airspace during a given period of time.

19. The medium as set forth in claim 18 wherein said actual temperatures at said plurality of said control points are measured using an infrared scanning system.

20. The medium as set forth in claim 19 wherein said infrared scanning system includes one or more infrared scanning cameras.

21. The medium as set forth in claim 12 and further including:
    establishing a high temperature limit value indicative of a high temperature alarm condition for one or more of said control points; and
    actuating an alarm system when said actual temperatures at said one or more control points exceed said high temperature limit value for a predetermined period of time.

22. The medium as set forth in claim 12 and further including:
    establishing a low temperature limit value indicative of a low temperature alarm condition for one or more of said control points; and
    actuating an alarm system when said actual temperatures at said one or more control points are less than said low temperature limit value for a predetermined period of time.

23. A system for controlling temperature at a plurality of control points, said control points lying along an edge of an object within an airspace surrounding said object, said object being movable within said airspace, said system comprising:
  a system bus;
  a CPU device connected to said system bus;
  memory means connected to said system bus; and
  measuring means for obtaining actual temperatures at a plurality of said control points within said airspace using an infrared temperature sensing means, said system further including means for comparing said actual temperatures at each respective one of said control points with a reference temperature database, said reference temperature database containing preferred temperatures at each respective one of said control points, and means for generating control signals for application to temperature control devices, said temperature control devices being operable in response to said control signals for changing temperatures at each respective one of said control points by varying air flow to each respective one of said control points whereby said actual temperatures at each respective one of said control points are made to approach said preferred temperatures at each respective one of said control points within said airspace, wherein said airspace comprises airspace immediately surrounding said object wherein said obtaining is accomplished by said infrared temperature sensing means located to effectively sense point temperatures at said control points of said object, said temperature control devices comprising air vents located near said object to effectively control air temperature at said various control points.

24. The system as set forth in claim 23 wherein said airspace comprises airspace immediately surrounding a passenger in a passenger-carrying vehicle, said measuring means comprising temperature sensing means located to effectively sense point temperatures at various body points of said passenger, said temperature control devices comprising air vents located near said passenger to effectively control air temperature at said various body points of said passenger, said system further including selection means operable by said passenger for inputting said preferred temperature for said passenger.

25. The system as set forth in claim 24 wherein said passenger-carrying vehicle is a motorized vehicle having capacity to carry a plurality of passengers.

26. The system as set forth in claim 25 wherein said passenger-carrying vehicle is an automobile.

27. The system as set forth in claim 25 wherein said passenger-carrying vehicle is a bus.

28. The system as set forth in claim 25 wherein said passenger-carrying vehicle is a train.

29. The system as set forth in claim 24 wherein said passenger-carrying vehicle is an airplane.

30. The system as et forth in claim 23 wherein said means for generating control signals further includes processing means effective for adjusting said control signals to compensate for heat emitting characteristics of various parts of a human body.

* * * * *